US012694023B1

(12) United States Patent
Schaeck et al.

(10) Patent No.: US 12,694,023 B1
(45) Date of Patent: Jul. 28, 2026

(54) RESPONDING TO QUERY USING EXPERT AUGMENTATION OF RETRIEVAL-AUGMENTED GENERATION

(71) Applicant: International Business Machines Corporation, Armonk, NY (US)

(72) Inventors: Thomas Schaeck, Boeblingen (DE); Robert Kern, Karlsruhe (DE); Sandeep Jajula, Hyderabad (IN); Krishna Teja Rekapalli, Pflugerville, TX (US); Joachim Rese, Hockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/041,291

(22) Filed: Jan. 30, 2025

(51) Int. Cl.
    *G06F 16/2452* (2019.01)
    *G06F 16/2458* (2019.01)
(52) U.S. Cl.
    CPC .... *G06F 16/24522* (2019.01); *G06F 16/2471* (2019.01)
(58) Field of Classification Search
    CPC .................. G06F 16/24522; G06F 16/2471
    See application file for complete search history.

(56) References Cited

U.S. PATENT DOCUMENTS

| | | | |
|---|---|---|---|
| 11,102,276 B2 | 8/2021 | Byron et al. | |
| 11,797,939 B2 * | 10/2023 | Bikumala | ............... G06F 40/30 |
| 2017/0206797 A1 * | 7/2017 | Solomon | ................ G06N 3/006 |
| 2021/0390144 A1 * | 12/2021 | B M S | .................... G06F 40/35 |
| 2023/0081891 A1 | 3/2023 | Kulkarni et al. | |
| 2024/0378198 A1 * | 11/2024 | Latendresse | ........ G06F 16/2425 |
| 2024/0378449 A1 | 11/2024 | Ausubel | |
| 2024/0386015 A1 | 11/2024 | Crabtree et al. | |

(Continued)

OTHER PUBLICATIONS neuralseek.com, "NeuralSeek Documentation," 2024 NeuralSeek, https://documentation.neuralseek.com/, Retrieved from the Internet: Mar. 27, 2025.

(Continued)

*Primary Examiner* — Dangelino N Gortayo
(74) *Attorney, Agent, or Firm* — Amin, Turocy & Watson, LLP

(57) ABSTRACT

A system includes a processor that executes computer executable components stored in a memory. The computer executable components can include a retrieval-augmented generation component linked to multiple knowledge base indexes and a reception component that receives a query and instructs the retrieval-augmented generation component to search a first knowledge base index of relevant documents. The computer executable components can include a question component that instructs the retrieval-augmented generation component to search a second knowledge base index of relevant expert question-answer pairs, and an expert identification component that instructs the retrieval-augmented generation component to search a third knowledge base index of expert profiles, identifies an at least one knowledge domain expert, and gathers input from the at least one expert. The computer executable components can include a response component that, upon a determination that there is sufficient information for a satisfactory response to the query, generates a response to the query.

20 Claims, 8 Drawing Sheets

(56)　　　　　References Cited

U.S. PATENT DOCUMENTS

| 2025/0005214 A1* | 1/2025 | Ganju | ..................... G06F 30/13 |
| 2025/0335795 A1* | 10/2025 | Gupta | ..................... G06N 5/04 |

OTHER PUBLICATIONS

Ramjee, et al., CataractBot: An LLM-Powered Expert-in-the-Loop Chatbot for Cataract Patients, arXiv:2402.04620v3 [cs.HC], Oct. 3, 2024, 22 pages.

* cited by examiner

600

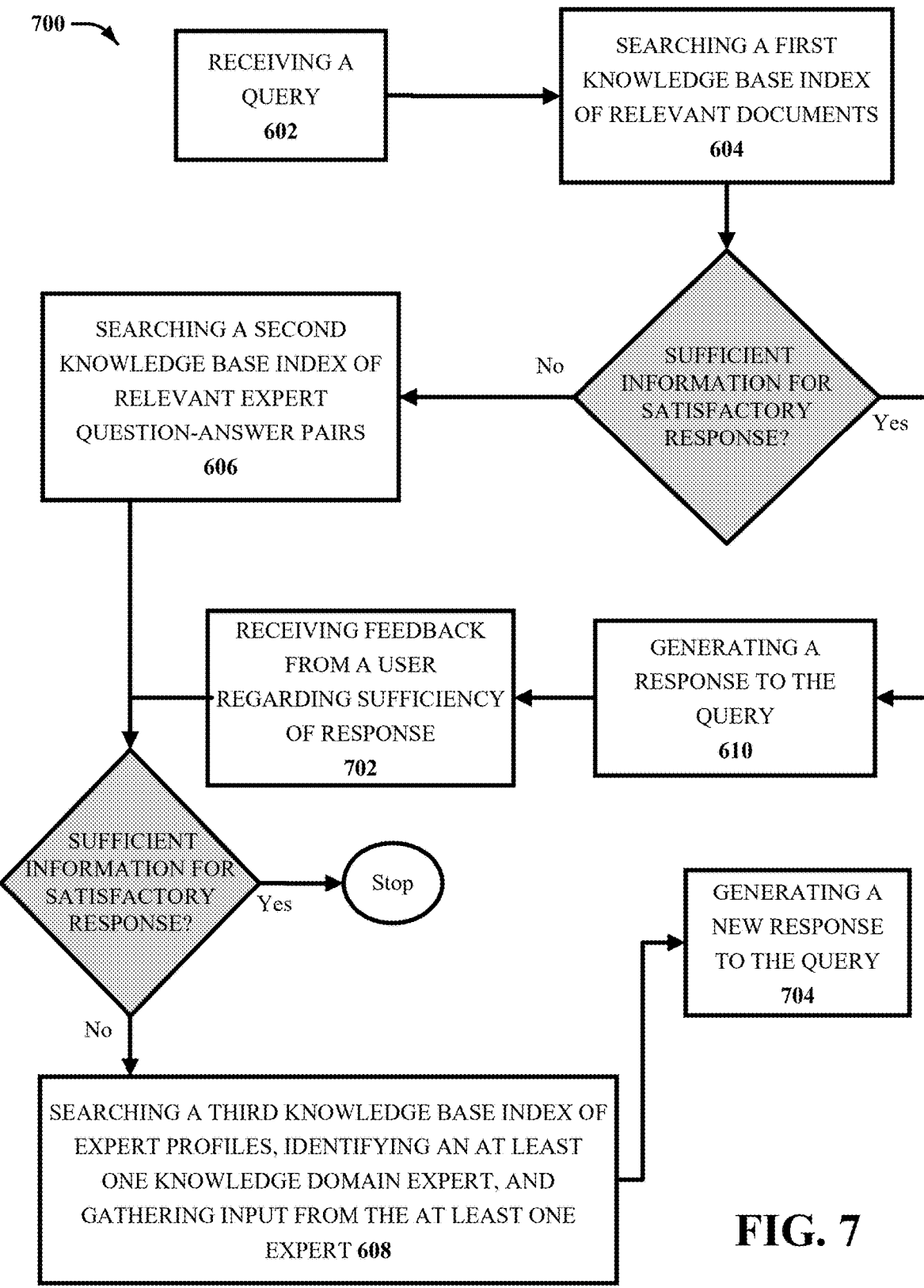

700

RECEIVING A
QUERY
602

SEARCHING A FIRST
KNOWLEDGE BASE INDEX
OF RELEVANT DOCUMENTS
604

SEARCHING A SECOND
KNOWLEDGE BASE INDEX OF
RELEVANT EXPERT
QUESTION-ANSWER PAIRS
606

No

SUFFICIENT
INFORMATION FOR
SATISFACTORY
RESPONSE?

Yes

RECEIVING FEEDBACK
FROM A USER
REGARDING SUFFICIENCY
OF RESPONSE
702

GENERATING A
RESPONSE TO THE
QUERY
610

SUFFICIENT
INFORMATION FOR
SATISFACTORY
RESPONSE?

Yes

Stop

No

GENERATING A
NEW RESPONSE
TO THE QUERY
704

SEARCHING A THIRD KNOWLEDGE BASE INDEX OF
EXPERT PROFILES, IDENTIFYING AN AT LEAST
ONE KNOWLEDGE DOMAIN EXPERT, AND
GATHERING INPUT FROM THE AT LEAST ONE
EXPERT 608

FIG. 7

800

COMPUTER   801

PROCESSOR SET   810

PROCESSING CIRCUITRY   820          CACHE   821

COMMUNICATION FABRIC   811

VOLATILE MEMORY   812

PERSISTENT STORAGE 813

OPERATING SYSTEM   822

KNOWLEDGE BASE UPDATE CODE

880

PERIPHERAL DEVICE SET   814

UI DEVICE SET   823          STORAGE   824          IoT SENSOR SET   825

NETWORK MODULE   815

WAN   802

END USER DEVICE   803

REMOTE SERVER   804

REMOTE DATABASE   830

PRIVATE CLOUD   806

GATEWAY   840

PUBLIC CLOUD   805

CLOUD ORCHESTRATION MODULE   841          HOST PHYSICAL MACHINE SET   842

VIRTUAL MACHINE SET   843          CONTAINER SET   844

FIG. 8

RESPONDING TO QUERY USING EXPERT AUGMENTATION OF RETRIEVAL-AUGMENTED GENERATION

BACKGROUND

The subject disclosure relates to retrieval-augmented generation (RAG), e.g., augmenting RAG systems with expert input to enhance query responses.

RAG systems are increasingly utilized in question-and-answer (Q&A) applications due to their ability to combine natural language generation with information retrieval from curated knowledge bases. These systems rely heavily on the quality, accuracy, and completeness of the knowledge base to deliver reliable and meaningful responses to user queries. However, gaps in knowledge bases can result in the production of inadequate answers, or in the inability of a RAG system to provide an answer at all. Thus, maintaining up-to-date and comprehensive knowledge bases is essential, yet presents a complex and ongoing challenge. User queries often evolve and can cover topics or scenarios not originally anticipated during the creation of a knowledge base. When a knowledge base lacks relevant information to address a query, a system's utility diminishes, potentially leading to user dissatisfaction. Thus, there is a need for technologies capable of filling in such knowledge gaps, thereby allowing RAG systems to continually provide accurate and contextually relevant answers.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate automated expert-augmented updating of knowledge bases for RAG systems are provided.

According to an embodiment, a system can comprise a processor that executes computer executable components stored in memory. The computer executable components can comprise a retrieval-augmented generation component linked to multiple knowledge base indexes. The computer executable components can comprise a reception component that receives a query, instructs the retrieval-augmented generation component to search a first knowledge base index of relevant documents, and evaluates whether there is sufficient information for a satisfactory response to the query. The computer executable components can further comprise a question component that instructs the retrieval-augmented generation component to search a second knowledge base index of relevant expert question-answer pairs, and evaluates whether there is sufficient information for a satisfactory response to the query. The computer executable components can further comprise an expert identification component that instructs the retrieval-augmented generation component to search a third knowledge base index of expert profiles, identifies an at least one knowledge domain expert, gathers input from the at least one expert, and evaluates whether there is sufficient information for a satisfactory response to the query. The computer executable components can further comprise a response component that, upon a determination by any of the preceding components that there is sufficient information for a satisfactory response to the query, generates a response to the query.

According to another embodiment, a computer-implemented method can comprise receiving, by a system operatively coupled to a processor, a query. The computer-implemented method can comprise searching, by the system, a first knowledge base index of relevant documents. The computer-implemented method can further comprise searching, by the system, a second knowledge base index of relevant expert question-answer pairs. The computer implemented method can further comprise searching, by the system, a third knowledge base index of expert profiles, identifying, by the system, an at least one knowledge domain expert, and gathering, by the system, input from the at least one expert. The computer implemented method can further comprise evaluating, by the system, whether there is sufficient information for a satisfactory response to the query and determining, by the system, that there is sufficient information for a satisfactory response to the query. The computer implemented method can further comprise generating, by the system, a response to the query.

According to another embodiment, a computer program product comprising a computer readable storage medium having program instructions embodied therewith, the program instructions executable by a processor to cause the processor to search, by the processor, a first knowledge base index of relevant documents. The program instructions can also cause the processor to search, by the processor, a second knowledge base index of relevant expert question-answer pairs. The program instructions can also cause the processor to search, by the processor, a third knowledge base index of expert profiles, identify, by the processor, an at least one knowledge domain expert, and gather, by the processor, input from the at least one expert. The program instructions can also cause the processor to evaluate, by the processor, whether there is sufficient information for a satisfactory response to the query and determine, by the processor, that there is sufficient information for a satisfactory response to the query. The program instructions can further cause the processor to generate, by the processor, a response to the query.

BRIEF DESCRIPTION OF THE DRAWINGS

FIGS. 6 and 7 illustrate flow diagrams of example computer implemented methods that facilitate automated expert-augmented updating of knowledge bases for RAG systems in accordance with some embodiments described herein.

FIG. 8 illustrates a block diagram of an example computing environment in which some embodiments described herein can be facilitated.

DETAILED DESCRIPTION

Figure 1:
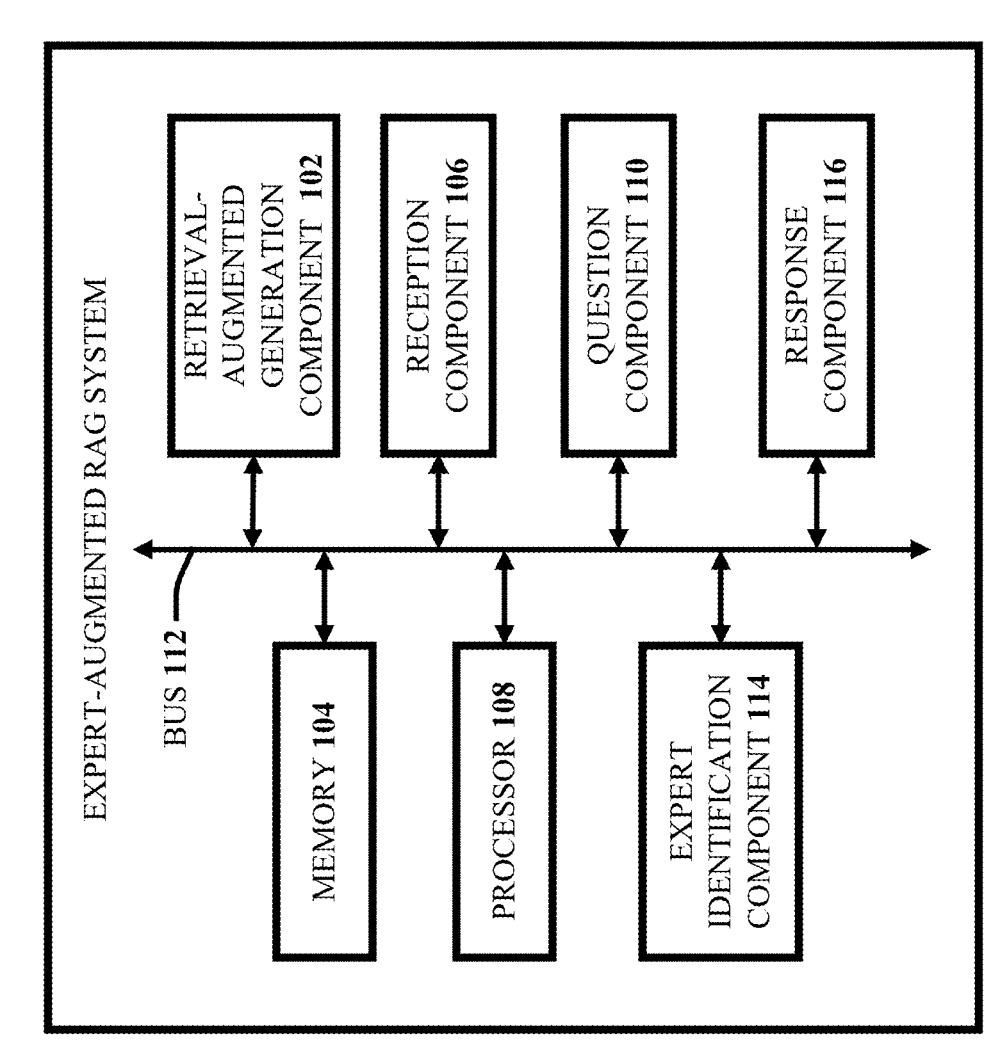
FIGS. 1 and 2 illustrate example systems that can facilitate automated expert-augmented updating of knowledge bases for RAG systems in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

Retrieval-Augmented Generation systems utilize an advanced hybrid architecture that can combine information retrieval techniques with generative language models to deliver contextually relevant and accurate responses to user queries. These systems can operate by leveraging a retrieval module and a generation module. The retrieval module can be responsible for searching external knowledge sources, such as structured or unstructured databases, document repositories, or curated knowledge bases, to extract information relevant to a user's query. The retrieval process can utilize traditional search algorithms (e.g., as term-based matching) or more sophisticated embedding-based models, which can generate dense vector representations of both the query and knowledge base content to enhance accuracy and relevance of retrieved results.

Once relevant data has been retrieved, the generation module can synthesize the information to create a coherent and contextually appropriate response. The generation module can be powered by advanced natural language processing models (e.g., transformer-based architectures) which can seamlessly integrate retrieved content with generative capabilities. This combined approach allows RAG systems to dynamically incorporate information from external knowledge sources, and ensures that RAG systems can address a wide range of user queries.

However, RAG systems rely heavily on the quality, completeness, and relevance of knowledge bases to generate accurate and meaningful responses. In real-world production environments, the curated knowledges base can fall short in addressing the full range of user queries. More specifically, a knowledge base cannot always anticipate or cover every possible query, especially where user needs evolve or new information emerges. Consequently, RAG systems can encounter scenarios where a user's question has no corresponding answer within the existing knowledge base, leading to incomplete or unsatisfactory responses.

To address this issue, knowledge bases require constant updates and proactive management to ensure that new information is curated and their data remains accurate, relevant, and structured for efficient retrieval. Without regular maintenance, knowledge bases risk becoming outdated, thereby diminishing the effectiveness of the RAG system over time. In cases where a knowledge base lacks sufficient information, the input of domain experts becomes essential. These experts can evaluate and respond to queries that fall outside the system's existing knowledge, providing accurate and contextually appropriate answers. Expert contributions can be integrated into the knowledge base, thereby ensuring that similar future queries are adequately addressed. The reliance of RAG systems on domain experts highlights the need for a robust mechanism within RAG systems to identify knowledge gaps, efficiently engage experts, and streamline the process of incorporating their insights into the knowledge base. Such mechanisms are critical to maintaining the utility and reliability of RAG systems in dynamic, real-world applications.

In relation to proactive knowledge base management, embodiments of the present disclosure produce a solution to one or more of these problems. These embodiments can solve such problems by searching a first knowledge base index of relevant documents and determining whether there is sufficient information to generate a satisfactory response to a query. These embodiments can also include searching a second knowledge base index of relevant expert question-answer pairs and determining whether there is sufficient information to generate a satisfactory response to a query. The embodiments disclosed herein can further include searching a third knowledge base index of expert profiles, identifying an at least one knowledge domain expert, and gathering input from the at least one expert to generate a response to the query.

According to an embodiment, a system can include a processor that executes computer executable components stored in memory. The computer executable components can comprise a retrieval-augmented generation component linked to multiple knowledge base indexes. The computer executable components can also comprise a reception component that receives a query, instructs the retrieval-augmented generation component to search a first knowledge base index of relevant documents, and evaluates whether there is sufficient information for a satisfactory response to the query. The computer executable components can further include a question component that instructs the retrieval-augmented generation component to search a second knowledge base index of relevant expert question-answer pairs, and evaluates whether there is sufficient information for a satisfactory response to the query. The computer executable components can comprise an expert identification component that instructs the retrieval-augmented generation component to search a third knowledge base index of expert profiles, identifies an at least one knowledge domain expert, gathers input from the at least one expert, and evaluates whether there is sufficient information for a satisfactory response to the query. Additionally, the computer executable components can include a response component that, upon a determination by any of the preceding components that there is sufficient information for a satisfactory response to the query, generates a response to the query.

In some embodiments of the system, the retrieval-augmented generation component can be linked to the first knowledge base index of relevant documents, the second knowledge base index of relevant expert question-answer pairs, or the third knowledge base index of expert profiles.

In various embodiments, the question component can instruct the retrieval-augmented generation component to search the second knowledge base index in response to an evaluation by the reception component that there is not sufficient information for a satisfactory response to the query.

In some embodiments of the system, the expert identification component can instruct the retrieval-augmented generation component to search the third knowledge base index of expert profiles in response to an evaluation by the question component that there is not sufficient information for a satisfactory response to the query In various embodiments, the system can further comprise a feedback component that can receive feedback from a user regarding sufficiency of a response to the query. The retrieval-augmented generation component can update a knowledge base index based on the received feedback.

According to an embodiment, the system can further comprise a verification component that can gather input from guardrails models or knowledge content owners to evaluate sufficiency of the first knowledge base index. The input gather by the verification component can pertain to at least one of: adherence to organizational policies, ethical standards, or regulatory requirements. The verification component can further identify inconsistencies, redundancies, or inaccuracies in a knowledge base index and can update the knowledge base.

In some embodiments, the system can further comprise a knowledge component that can receive input from a knowledge owner and update a knowledge base index based on the received input. In various embodiments, the knowledge owner can verify that the received input is utilized by the reception component, question component, or expert identification component to evaluate whether there is sufficient information for a satisfactory response to the query. The knowledge owner can verify that the received input is present within a knowledge base index. The knowledge owner can verify that a knowledge base index has been updated to incorporate the received input.

In various embodiments, the expert identification component can identify the at least one knowledge domain expert based on qualifications or contextual information. The qualifications can further comprise a degree to which the knowledge domain expert's associated profile aligns with a subject matter or content of the query. The degree to which the knowledge domain expert's associated profile aligns with the subject matter or content of the query can be determined by at least one of: the expert's expertise area, experience, or relevant certifications. The contextual information can further comprise at least one of: historical responsiveness of the expert to prior queries, availability of the expert, or urgency of the query.

Advantages of this system may include enhanced accuracy, reliability, and adaptability. Expert input also allows the system to expand its knowledge bases to include specialized, nuanced, or emerging topics, thereby ensuring more comprehensive coverage of user queries.

According to some embodiments, the above-described computer system may be implemented as a computer-implemented method or as a computer program product.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments may be practiced without these specific details, yet a person having ordinary skill in the art will recognize that such embodiments are within metes and bounds of this disclosure.

FIG. 1 illustrates an example system 100 for facilitating automated expert-augmented updating of knowledge bases for RAG systems. The system 100 uses retrieval-augmented generation component, a reception component, a question component, an expert identification component, and a response component. The retrieval-augmented generation component can be linked to multiple knowledge base indexes. The reception component can receive a query, instruct the retrieval-augmented generation component to search a first knowledge base index of relevant documents, and can evaluate whether there is sufficient information for a satisfactory response to the query. The question component can instruct the retrieval-augmented generation component to search a second knowledge base index of relevant expert question-answer pairs, and can evaluate whether there is sufficient information for a satisfactory response to the query. The expert identification component can instruct the retrieval-augmented generation component to search a third knowledge base index of expert profiles, identify an at least one knowledge domain expert, gather input from the at least one expert, and can evaluate whether there is sufficient information for a satisfactory response to the query. The response component can, upon a determination by any of the preceding components that there is sufficient information for a satisfactory response to the query, generate a response to the query.

Aspects of systems (e.g., systems 100, 200, and the like), apparatuses, or processes in various embodiments of the present disclosure can constitute one or more machine-executable components embodied within one or more machines. For example, the components may be embodied in one or more computer readable mediums (or media) associated with one or more machines. Such components, when executed by the one or more machines (e.g., computers, computing devices, virtual machines, etc.) can cause the machines to perform the operations described. System 100 can comprise a retrieval-augmented generation component 102, a memory 104, a reception component 106, a processor 108, a question component 110, a system bus 112, an expert identification component 114, and a response component 116.

The system 100 and/or the components of the system 100 may use hardware and/or software to solve problems that are highly technical in nature. The system 100 solves problems that are not abstract and that cannot be performed as a set of mental acts by a human. Further, some of the processes can be performed by specialized computers for carrying out defined tasks related to updating of knowledge bases for RAG systems. The system 100 and/or components of the system 100 can be employed to solve new problems that arise through advancements in technologies. The system 100 can provide technical improvements to updating knowledge bases for RAG systems by enhancing accuracy, reliability, and adaptability of such systems by relevant knowledge bases to include specialized, nuanced, or emerging topics, thereby ensuring more comprehensive coverage of user queries.

The system 100 can include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that may be operably connected to the processor 108. The memory 104 can store computer-executable instructions that, upon execution by the processor 108, can cause the processor 108 and/or one or more other components of the system 100 (e.g., the retrieval-augmented generation component 102, the reception component 106, the question component 110, the expert identification component 114, and/or the response component 116) to perform one or more actions. In some embodiments, the memory 104 can store computer-executable components (e.g., the retrieval-augmented generation component 102, the reception component 106, the question component 110, the expert identification component 114, and/or the response component 116).

The system 100 and/or a component thereof as described herein can be communicatively, electrically, operatively, optically, and/or otherwise coupled to one another via a bus 112. The bus 112 can include one or more of a memory bus, memory controller, peripheral bus, external bus, local bus, and/or another type of bus that may employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In various embodiments, the retrieval-augmented generation (RAG) component 102 can be linked to an at least one knowledge base. According to some embodiments, the RAG component 102 can be linked to a first knowledge base index of relevant documents, a second knowledge base index of relevant expert question-answer pairs, or a third knowledge base index of expert profiles. Rag component 102 can be a core system module designed to enhance the accuracy and relevance of generated responses by dynamically retrieving information from knowledge base indexes. In various embodiments, the RAG component 102 can be linked to at least one knowledge base, enabling it to source information beyond pre-trained data. According to some embodiments, the RAG component 102 can operate by retrieving information from different types of knowledge bases, including a first knowledge base index containing relevant documents, a second knowledge base index storing expert-curated question-answer pairs, and a third knowledge base index comprising expert profiles. When processing a user query, the RAG component 102 can identify a most relevant knowledge source, can retrieve pertinent data, and can synthesize a response (e.g., using a language generation model). By leveraging multiple structured and expert-driven sources, RAG component 102 can ensure that generated answers are contextually accurate and comprehensive, thereby improving overall reliability and effectiveness of the system 100.

In various embodiments, RAG component 102 can integrate additional knowledge base indexes and retrieval mechanisms to improve response accuracy, contextual relevance, or adaptability. According to an embodiment, the RAG component 102 can be linked to a fourth knowledge base index comprising verified user-generated content (e.g., frequently asked questions (FAQs), discussion forum insights, crowdsourced knowledge, etc.). This knowledge base can be curated through validation mechanisms (e.g., expert review, user voting, automated fact-checking, etc.) to ensure reliability. In another embodiment, the RAG component 102 can incorporate a user profile-based retrieval mechanism that customizes responses based on user history, expertise level, or stated preferences, thereby enabling the system 100 to provide customized explanations to users. For example, the system 100 can provide simplified explanations to novice users while delivering more technical and detailed responses to expert users.

In some embodiments, the RAG component 102 can utilize an adaptive ranking and weighting mechanism to dynamically prioritize knowledge sources. RAG component 102 can prioritize knowledge sources based on factors such as relevance to a query, historical accuracy, reliability, or time sensitivity. By ranking knowledge sources dynamically, the system 100 can ensure that relevant, up-to-date information is retrieved and used in response generation. Additionally, in certain embodiments, the system 100 can include a feedback-driven knowledge base update mechanism, wherein user and expert feedback on generated responses can be collected and used to refine a knowledge base over time. This can enable continuous learning and improvement, thereby ensuring that outdated or incorrect information is identified and corrected.

In some embodiments, RAG component 102 can extend beyond text-based knowledge retrieval to incorporate multi-modal data sources, including image-based content, diagrams, charts, structured databases, and multimedia transcripts. This incorporation of multi-modal data sources can enhance the applicability of the system 100 in domains that require visual or structured data, such as medical diagnostics, engineering, and education. In another embodiment, the RAG component 102 can integrate real-time data retrieval capabilities, allowing it to access live data sources such as financial market reports, regulatory updates, or streaming sensor data. The integration of real-time data can ensure that responses generated by the system 100 can incorporate current and relevant information.

According to some embodiments, the reception component 106 can receive a query. The reception component 106 can instruct the retrieval-augmented generation component 102 to search a first knowledge base index of relevant documents. Reception component 106 can further evaluate whether there is sufficient information for a satisfactory response to the query.

The reception component 106 can serve as a primary interface for receiving user queries and managing initial processing of information retrieval within the system 100. In various embodiments, the reception component 106 can be configured to receive a query and instruct the RAG component 102 to search a first knowledge base index of relevant documents. Upon retrieving the relevant content, the reception component 106 can further evaluate whether the retrieved information is sufficient to generate a satisfactory response. If the retrieved content lacks completeness, accuracy, or contextual relevance, the reception component 106 can trigger additional processes, such as querying alternative knowledge base indexes or escalating the query to a domain expert for further input.

In certain embodiments, the reception component 106 can include query classification capabilities. The reception component 106 can analyze a nature of an incoming query to determine whether the query falls within predefined categories, such as factual queries, decision-support queries, or subjective inquiries. The system 100 can apply different retrieval strategies based on the type of query as determined by the reception component 106. Additionally, in some embodiments, the reception component 106 can incorporate natural language processing (NLP) techniques to refine or rephrase queries before passing them to a retrieval module, thereby ensuring that any performed search is optimized for the most relevant results.

In some embodiments, the reception component 106 can implement a confidence assessment mechanism to evaluate the reliability of retrieved results. The confidence assessment mechanism can be based on predefined thresholds. For example, if a confidence score is low, the reception component 106 can automatically initiate a secondary retrieval process, such as expanding a search scope, referencing a second knowledge base index (e.g., containing expert-verified question-answer pairs), or escalating the query to a human expert. In another embodiment, reception component 106 can support multi-turn query resolution, allowing users to iteratively refine questions based on system-generated clarifications. Additionally, in real-time applications, reception component 106 can integrate real-time feedback mechanisms, thereby enabling users to provide feedback on response quality, which can then be used to refine a knowledge base or retrieval strategies.

According to some embodiments, the question component 110 can instruct the retrieval-augmented generation component 102 to search a second knowledge base index of relevant expert question-answer pairs. The question component 110 can further evaluate whether there is sufficient information for a satisfactory response to the query. In various embodiments, the question component 110 can instruct the retrieval-augmented generation component 102 to search the second knowledge base index in response to an evaluation by the reception component 106 that there is not sufficient information for a satisfactory response to the query. The question component 110 can function as a specialized module that enhances the retrieval process by leveraging a second knowledge base index containing expert question-answer pairs. In various embodiments, the question component 110 can instruct the retrieval-augmented generation component 102 to search the second knowledge base index when determining whether a satisfactory response to a query can be generated. The question component 110 can further evaluate whether the retrieved expert question-answer pairs provide sufficient information to address a query effectively. In some embodiments, the question component 110 can be triggered by the reception component 106 upon determining that the first knowledge base index does not contain sufficient information for a complete or contextually relevant response. By utilizing expert-verified question-answer pairs, the question component 110 can enhance the accuracy and reliability of the system 100.

In certain embodiments, the question component 110 can implement a semantic similarity assessment, wherein it compares a query to previously answered expert question-answer pairs to identify most relevant matches. This can allow the system 100 to retrieve and repurpose expert-validated responses, thereby reducing the need for redundant expert input. Additionally, in some embodiments, the question component 110 can incorporate adaptive ranking mechanisms, prioritizing question-answer pairs based on factors such as relevance, recency, and expert credibility. This ranking system can ensure that authoritative and up-to-date responses are surfaced.

Further, in some embodiments, the question component 110 can integrate a query refinement mechanism, wherein it can suggest modifications to an original query based on patterns observed in the expert question-answer index. This refinement process can improve retrieval efficiency by aligning a query with previously answered expert responses. Additionally, in cases where the second knowledge base index does not contain sufficient information, the question component 110 can escalate the query to a domain expert for real-time input or initiate a request to update a knowledge base with an expert-sourced answer. In some embodiments, the question component 110 can also support multi-source fusion, allowing it to synthesize responses by combining information from the expert question-answer index with documents retrieved from the first knowledge base index.

According to some embodiments, the expert identification component 114 can instruct the retrieval-augmented generation component 102 to search a third knowledge base index of expert profiles. The expert identification component 114 can identify an at least one knowledge domain expert. The expert identification component 114 can gather input from the at least one expert, and can evaluate whether there is sufficient information for a satisfactory response to the query. In various embodiments, the expert identification component 114 can identify the at least one knowledge domain expert based on qualifications or contextual information. The qualifications can further comprise a degree to which the knowledge domain expert's associated profile aligns with a subject matter or content of the query. The degree to which the knowledge domain expert's associated profile aligns with the subject matter or content of the query can be determined by at least one of: the expert's expertise area, experience, or relevant certifications. The contextual information can further comprise at least one of: historical responsiveness of the expert to prior queries, availability of the expert, or urgency of the query.

The expert identification component 114 can function as a specialized module that facilitates the selection and engagement of domain experts when a query cannot be satisfactorily answered using existing knowledge base indexes (e.g., the first knowledge base index of relevant documents and/or the second knowledge base index of relevant expert question-answer pairs). In various embodiments, the expert identification component 114 can instruct the retrieval-augmented generation component 102 to search a third knowledge base index containing expert profiles. The expert identification component 114 can identify at least one knowledge domain expert whose expertise is relevant to the subject matter of a query. Once an expert is identified, the expert identification component 114 can gather input from the expert and evaluate whether the provided information is sufficient to generate a satisfactory response to the query.

In certain embodiments, the expert identification component 114 can determine the suitability of an expert based on qualifications, which can include factors such as an expert's expertise area, experience, and relevant certifications. Additionally, the expert identification component 114 can incorporate contextual information, such as an expert's historical responsiveness to prior queries, real-time availability, and the urgency of the query.

In some embodiments, the expert identification component 114 can implement an expert ranking mechanism, wherein identified experts can be ranked based on a combination of qualifications and contextual factors. This ranking can ensure that a qualified and responsive expert is selected for each query. Additionally, in certain embodiments, the expert identification component 114 can support a collaborative expert consultation process, wherein multiple experts can be engaged when a query requires input from diverse knowledge areas. The expert identification component 114 can engage multiple experts and can gather input from the multiple experts. The expert identification component 114 can select a top or best input from the gathered input of the multiple experts. The expert identification component 114 can gather input from the multiple experts and evaluate whether the provided information is sufficient to generate a satisfactory response to a query. The expert identification component 114 can utilize inputs gathered from multiple experts to generate a response to a query.

In some embodiments, the expert identification component 114 can integrate a real-time availability tracking system, thereby allowing the system 100 to prioritize experts who are available to provide input within a required timeframe. In various embodiments, the expert identification component 114 can support an automated expert feedback loop, wherein expert-provided responses are evaluated, refined, and incorporated into a knowledge base for future retrieval. This feedback mechanism can enable continuous improvement of a knowledge repository of system 100, thereby reducing the need for repeated expert intervention on similar queries.

According to some embodiments, the response component 116 can generate a response to the query. The response component 116 can function as the final processing module responsible for generating a response to a user query based on information retrieved and evaluated by other system components (e.g., the retrieval-augmented generation component 102, the reception component 106, the question component 110, and/or the expert identification component 114). In various embodiments, the response component 116 can generate a response once one of the other components, such as the reception component 106, question component 110, or expert identification component 114, determines that there is sufficient information to provide a satisfactory answer the query. The response component 116 can synthesize the retrieved content, expert-provided input, or previously stored expert-verified question-answer pairs into a coherent and contextually appropriate response. In some embodiments, the response component 116 can leverage natural language generation (NLG) techniques to format a response in a user-friendly and contextually relevant manner, thereby ensuring clarity and readability of the response.

In certain embodiments, the response component 116 can incorporate a response optimization mechanism, wherein the response component 116 can refine a generated response by applying linguistic enhancements, summarization techniques, or contextual adjustments based on a query type and/or user preferences. Additionally, the response component 116 can include a response validation module that can cross-check a generated response against confidence thresholds or predefined accuracy metrics. In some embodiments, the response component 116 can support adaptive response formatting to tailor responses based on a user's preferences, query complexity, or domain-specific requirements. For example, the response component 116 can structure responses as concise summaries, detailed explanations, or step-by-step procedural instructions.

In various embodiments, the response component 116 can integrate a multi-modal response capability to generate responses that include text, visual elements (e.g., diagrams or charts), or structured data. Additionally, in some embodiments, the response component 116 can implement a real-time feedback collection mechanism, enabling a user to provide feedback on a response's accuracy and/or usefulness. Received feedback can be processed (e.g., by the retrieval-augmented generation component 102, the reception component 106, the question component 110, the expert identification component 114, and/or the response component 116) to refine future responses or to update a knowledge base.

Figure 2:
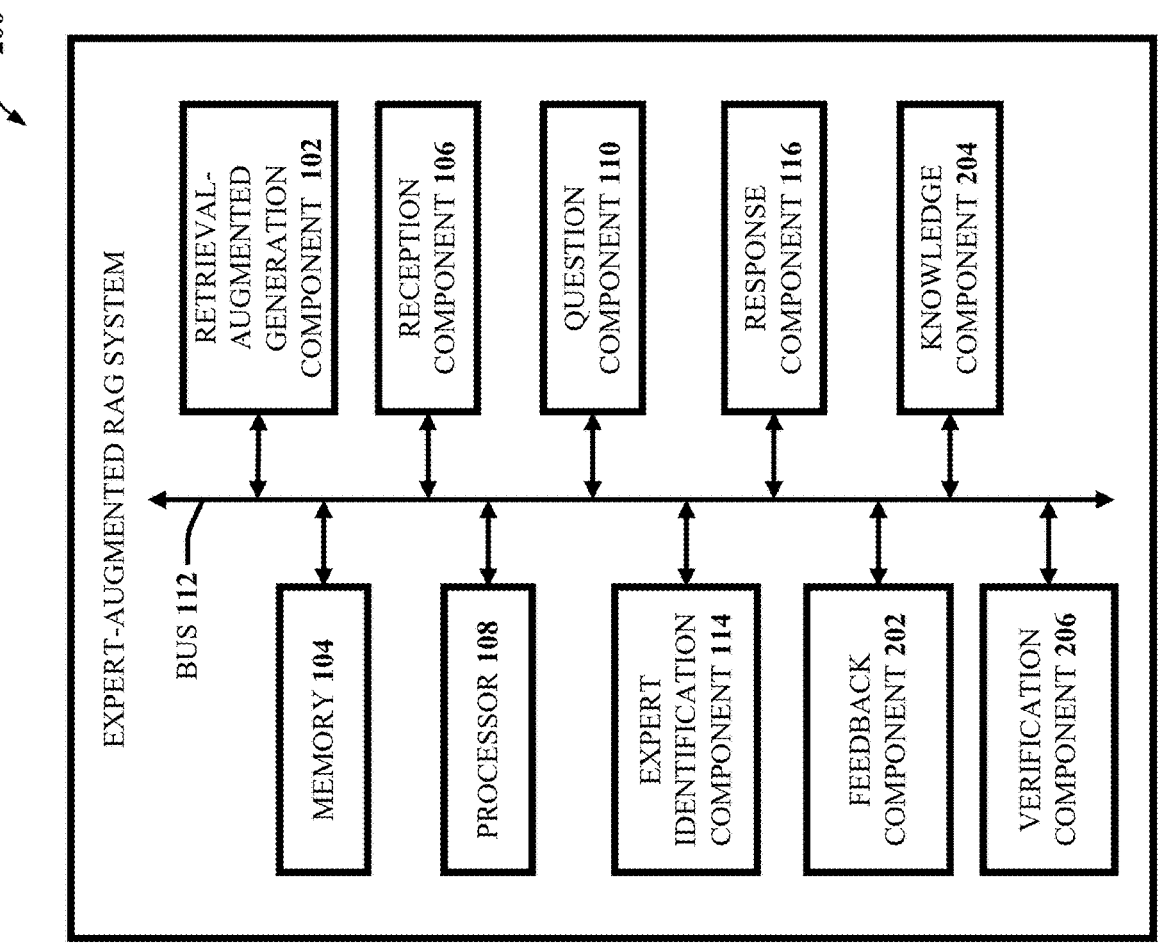

Next, FIG. 2 illustrates an example system 200 that can facilitate automated expert-augmented updating of knowledge bases for RAG systems. The system 200 uses retrieval-augmented generation component 102, reception component 106, question component 110, expert identification component 114, and response component 116. The system 200 can use a feedback component 202 that can receive feedback from a user regarding sufficiency of a response to a query, and a knowledge component 204 that can receive input from a knowledge owner and update a knowledge base index based on the received input. In various embodiments, the knowledge owner can verify that the received input is utilized by the reception component, question component, or expert identification component to evaluate whether there is sufficient information for a satisfactory response to the query. The knowledge owner can verify that the received input is present within a knowledge base index. The knowledge owner can verify that a knowledge base index has been updated to incorporate the received input. The system 200 can further use a verification component that can gather input from guardrails models or knowledge content owners to evaluate sufficiency of a knowledge base index. The system 200 can include a memory 104, processor 108, and a system bus 112. Description of like components has been omitted for the sake of brevity.

In various embodiments, the feedback component 202 can receive feedback from a user regarding sufficiency of a response to the query. The retrieval-augmented generation component 102 can update a knowledge base index based on the received feedback. The reception component 106 can update a knowledge base index based on the received feedback. The question component 110 can update a knowledge base index based on the received feedback. The expert identification component 114 can update a knowledge base index based on the received feedback. The response component 116 can update a response based on the received feedback.

The feedback component 202 can function as a critical module for refining system 200 responses and improving the accuracy and relevance of a knowledge base over time. In various embodiments, the feedback component 202 can receive feedback from a user regarding the sufficiency of a response to a query. This feedback can include user ratings, comments, or corrective inputs indicating whether a provided response is accurate, complete, or contextually appropriate. The feedback component 202 can facilitate updates to various knowledge base indexes and system components to enhance future responses. In some embodiments, the retrieval-augmented generation component 102 can update a knowledge base index based on the received feedback to improve the retrieval of relevant documents for similar future queries. Similarly, the reception component 106 can update a knowledge base index to refine query classification and retrieval strategies. The question component 110 can update a knowledge base index of expert question-answer pairs to incorporate user feedback, while the expert identification component 114 can refine expert selection criteria based on feedback related to expert-provided responses. Additionally, the response component 116 can modify or refine a generated response in real time to align more closely with user expectations based on the received feedback.

In certain embodiments, the feedback component 202 can implement an automated feedback analysis mechanism, wherein received feedback can be categorized and processed using natural language processing (NLP) techniques to determine patterns in user dissatisfaction or improvement suggestions. System 200 can autonomously identify common gaps in a knowledge base and prioritize specific areas for refinement. Additionally, in some embodiments, the feedback component 202 can support a real-time feedback loop, wherein responses can be dynamically adjusted based on user feedback (e.g., within an active query session). In various embodiments, the feedback component 202 can integrate a weighted feedback system, where inputs from verified domain experts can carry more weight in updating the knowledge base as compared to general user feedback.

In some embodiments, feedback component 202 can trigger expert review workflows, wherein low-confidence responses or negative feedback instances can prompt an expert to review and refine information before it is incorporated into a knowledge base. In certain implementations, feedback component 202 can also track longitudinal feedback trends, allowing the system 200 to measure response accuracy and user satisfaction over time, thereby guiding continuous improvements to retrieval strategies, expert engagement processes, and response generation.

In some embodiments, knowledge component 204 can receive input from a knowledge owner and update a knowledge base index based on the received input. In various embodiments, the knowledge owner can verify that the received input is utilized by the reception component, question component, or expert identification component to evaluate whether there is sufficient information for a satisfactory response to the query. The knowledge owner can verify that the received input is present within a knowledge base index. The knowledge owner can verify that a knowledge base index has been updated to incorporate the received input. Knowledge component 204 can function as a dedicated module for integrating input from a knowledge owner into a knowledge base of the system 200. In various embodiments, the knowledge component 204 can receive input from a knowledge owner, such as a subject matter expert, content administrator, or designated authority, and update a knowledge base index based on the received input. The knowledge component 204 can facilitate structured updates by verifying, formatting, and/or categorizing received information before integrating the received information into a relevant knowledge base index. In some embodiments, the knowledge component 204 can incorporate and/or validated user feedback (e.g., received via feedback component 202) into a knowledge base update, thereby ensuring that any improvements suggested by a user are reviewed and refined by a knowledge owner before being added to the system 200.

In certain embodiments, the knowledge component 204 can optimize how newly added knowledge is indexed and retrieved for future queries. The knowledge component 204 can refine query categorization, thereby ensuring that similar queries are mapped to a most relevant knowledge source. Additionally, in some embodiments, the knowledge component 204 can curate expert question-answer pairs derived from knowledge owner input.

In various embodiments, the knowledge component 204 can update expert profiles. The knowledge component 204 can refine how new information is structured within a response. In some embodiments, the knowledge component 204 can integrate a version control or knowledge tracking mechanism, allowing the system 200 to log, compare, and revert knowledge updates as needed.

According to an embodiment, the verification component 206 can gather input from guardrails models or knowledge content owners to evaluate sufficiency of a knowledge base index. The input gather by the verification component 206 can pertain to at least one of: adherence to organizational policies, ethical standards, or regulatory requirements. The verification component 206 can further identify inconsistencies, redundancies, or inaccuracies in a knowledge base index and can update the knowledge base.

The verification component 206 can ensure the integrity, accuracy, and compliance of a knowledge base by evaluating its sufficiency based on input from guardrails models or knowledge content owners. In various embodiments, the verification component 206 can gather input related to at least one of the following criteria: adherence to organizational policies, compliance with ethical standards, or alignment with regulatory requirements. The verification component 206 can identify inconsistencies, redundancies, or inaccuracies in a knowledge base index and can initiate updates to correct or refine stored information. By continuously monitoring the quality of the knowledge base(s), the verification component 206 can improve the accuracy and trustworthiness of responses generated by the system 200.

In certain embodiments, the verification component 206 can validate new knowledge updates before they are integrated into a knowledge base. The verification component 206 can optimize the retrieval of verified and policy-compliant information, thereby ensuring that only high-quality knowledge is surfaced for user queries. The verification component 206 can prioritize verification efforts based on recurring user feedback (e.g., about incorrect or unclear responses). In various embodiments, the verification component 206 can ensure that expert profiles meet predefined credibility and compliance standards before input by the expert(s) is incorporated into a knowledge base. In some implementations, the verification component 206 can integrate an automated anomaly detection mechanism, allowing it to flag questionable data patterns, bias, or outdated information for manual or automated review. Additionally, the verification component 206 can support a tiered approval system, wherein flagged knowledge entries undergo multiple layers of validation before being finalized in the knowledge base. Moreover, in certain embodiments, the verification component 206 can provide real-time validation feedback to ensure that generated responses (e.g. via the response component 116) comply with regulatory and ethical guidelines.

The systems and/or devices are described herein with respect to interaction between one or more components. Such systems and/or components may include the components and/or sub-components specified therein, one or more of the specified components and/or sub-components, and/or additional components. Sub-components may be implemented as components communicatively coupled to other components rather than included within parent components. One or more components and/or sub-components may be combined into a single component providing aggregate functionality. The components may interact with one or more other components not specifically described herein for the sake of brevity but known by those of skill in the art.

Figure 3:
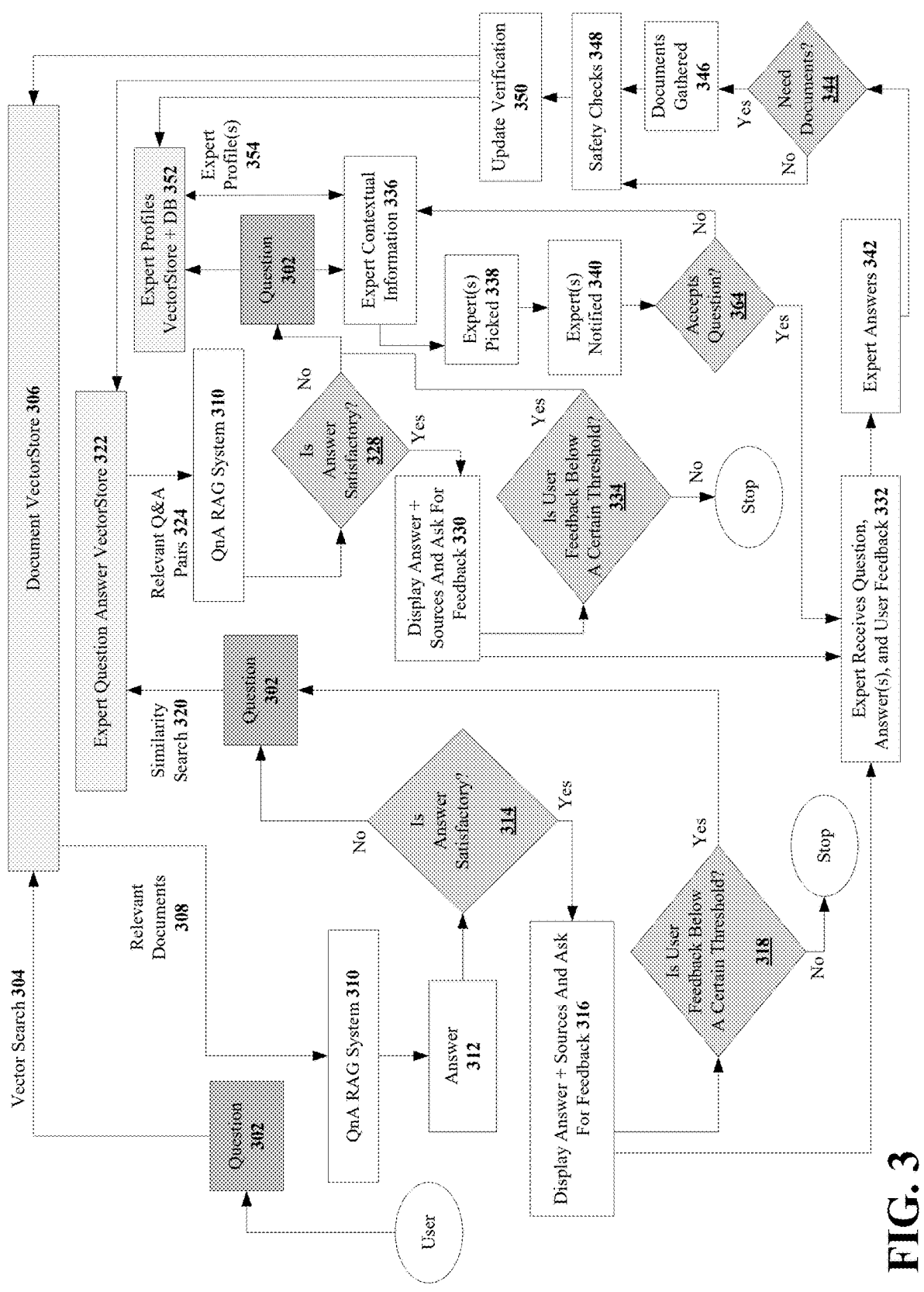
FIG. 3 illustrates an example expert-augmented knowledge bases update flow diagram in accordance with some embodiments described herein.

FIG. 3 illustrates an example expert-augmented knowledge bases update flow diagram 300 that can facilitate automated expert-augmented updating of knowledge bases for RAG systems.

The flow diagram 300 starts by receiving 302 a query (e.g., receiving a question from a user). The flow diagram 300 continues by performing 304 a vector search of a Document VectorStore 306 (e.g., a first knowledge base index of relevant documents). The flow diagram 300 continues by retrieving 306 relevant documents and providing them to a question-and-answer (QnA) retrieval-augmented generation system 310. The QnA RAG system 310 then outputs an answer 312.

The flow diagram 300 continues by evaluating 314 whether the outputted answer is satisfactory. If the outputted answer is satisfactory, the flow diagram 300 continues to 316, wherein the answer and sources used in formulating the answer (e.g., relevant documents from 306) are displayed to a user along with a request for feedback. The flow diagram 300 continues to 332, wherein the received question and outputted answer are given to a subject matter expert for consideration (see below for discussion of 332). The flow diagram 300 simultaneously proceeds to 318 whether the user feedback is evaluated to determine whether it is below a certain threshold. If the user feedback is not below (e.g., is above) the threshold, the flow diagram 300 ends. If the user feedback is below the threshold, flow diagram 300 continues to similarity search 320 (see below).

Returning to 314, if the outputted answer is not satisfactory, the flow diagram 300 continues to 320, wherein a similarity search is performed on the received question 302 by comparing the received question to expert question and answer pairs in Expert Question and Answer VectorStore 322. Relevant expert question and answer pairs are then output 324 to the QnA Rag System 310, which uses the question and answer pairs to generate an answer to the question 302 (e.g., via question component 110). The flow diagram 300 then continues to 328, wherein the outputted answer is evaluated to determine whether or not it is satisfactory.

If the outputted answer is satisfactory, the flow diagram 300 continues to 330, wherein the answer and sources used in formulating the answer (e.g., relevant documents from 306, question and answer pairs from 324) are displayed to a user along with a request for feedback. The flow diagram 300 continues to 332, wherein the received question and outputted answer are given to a subject matter expert for consideration (see below for discussion of 332). The flow diagram 300 simultaneously proceeds to 334 whether the user feedback is evaluated to determine whether it is below a certain threshold. If the user feedback is not below (e.g., is above) the threshold, the flow diagram 300 ends. If the user feedback is below the threshold, flow diagram 300 continues to expert search 352 (see below).

Returning to 328, if the outputted answer is not satisfactory, the flow diagram 300 continues to 352, wherein a knowledge base index of expert profiles is searched through and knowledge domain experts are identified and evaluated (e.g., via expert identification component 114) based on the received question 302 and any relevant expert contextual information 336. The flow diagram 300 then continues to 338, wherein at least one expert is selected and notified 340. At 364, the selected expert(s) can accept or reject the question (e.g., choose whether to answer the received question 302). If the expert does not accept the question, the flow diagram 300 returns to 336 to update the expert contextual information based on the expert's rejection of the question, which is then used to update the knowledge base index of expert profiles 352.

If the expert accepts the question at 364 (e.g., chooses to answer the question), the flow diagram 300 proceeds to 332, wherein the expert receives the question 302, any answer(s) generated by the QnA RAG System 310, and any feedback received from the user. The expert then uses this information to formulate an expert answer 342. The flow diagram 300 proceeds to evaluating 344 whether any additional documents are needed. If no additional documents are needed, the flow diagram 300 proceeds safety checks 348. If additional documents are needed, those documents are gathered at 346 before proceeding to safety checks 348. At 348, safety checks are performed (e.g., via verification component 206). Input from guardrails models or knowledge content owners is gathered at 348 to evaluate sufficiency of any updates to one or more knowledge bases (e.g., Document VectorStore 306, Expert Question and Answer VectorStore 322, and/or Expert Profiles VectorStore 352). The knowledge bases are then updated based on the gathered input, and the flow diagram 300 ends.

Figure 4:
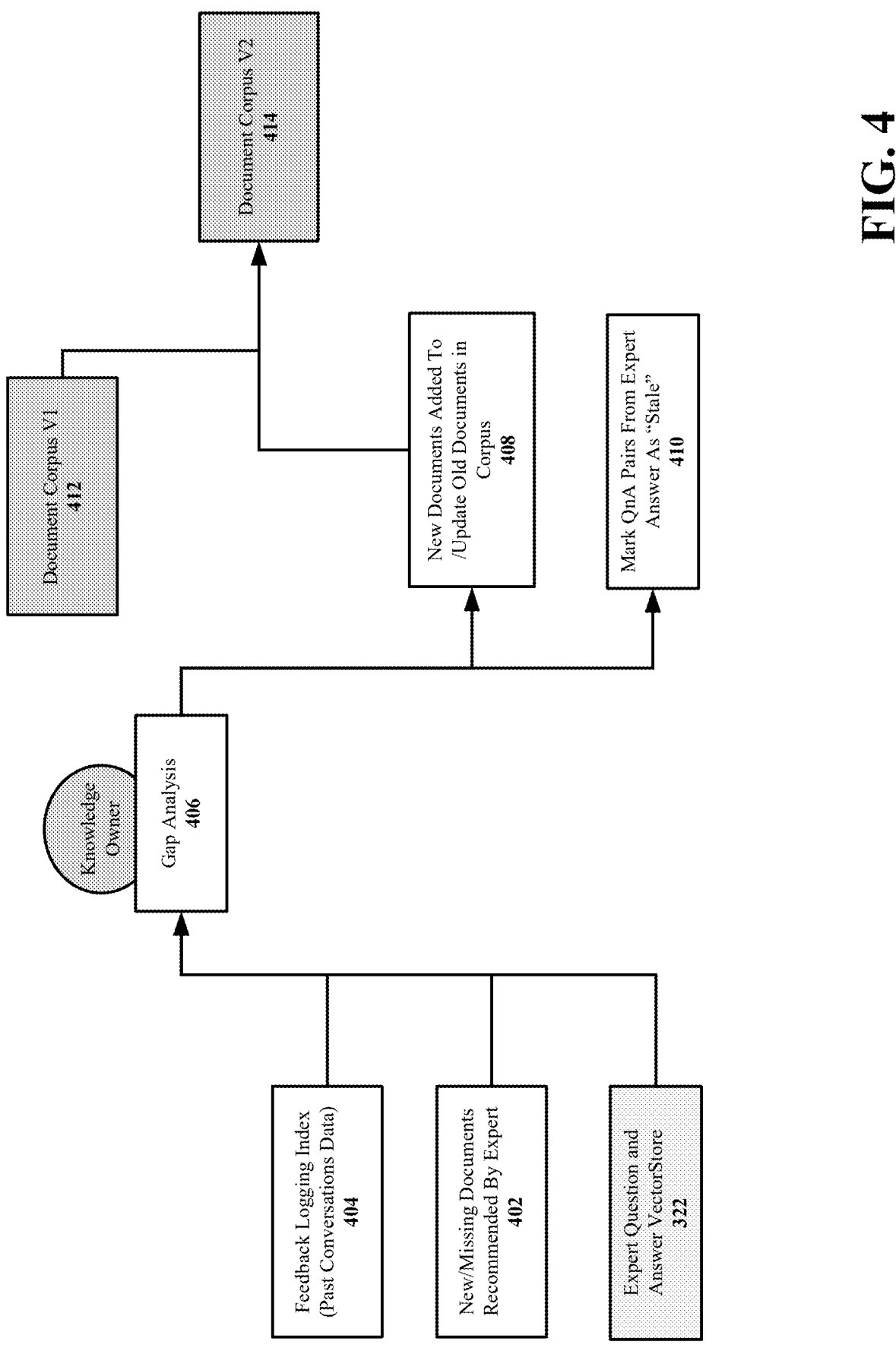
FIG. 4 illustrates an example knowledge owner flow diagram in accordance with some embodiments described herein.

FIG. 4 illustrates an example knowledge owner flow diagram 400 that can facilitate automated expert-augmented updating of knowledge bases for RAG systems. The knowledge owner flow diagram 400 starts by receiving as input the expert question and answer pairs from the Expert Question and Answer VectorStore 322, any new or missing documents recommended by the expert(s) 402, and past conversation data from Feedback Logging Index 404. These inputs are then used by a Knowledge Owner to perform a Gap Analysis 406. The GAP analysis performed by the Knowledge Owner can then be applied to detect missing, incomplete, or outdated information within the knowledge base indexes. The knowledge owner flow diagram 400 continues by 408 identifying new documents to be added or old documents to be updated within a knowledge base index (e.g., the first knowledge base index of relevant documents). The knowledge owner flow diagram 400 simultaneously proceeds to 410, wherein outdated question and answer pairs (e.g. in the second knowledge base index of relevant expert question-answer pairs) are identified. The knowledge owner flow diagram 400 then continues by updating a first version 412 of a knowledge base index to a second version 414. The knowledge owner flow diagram 400 then ends.

Figure 5:
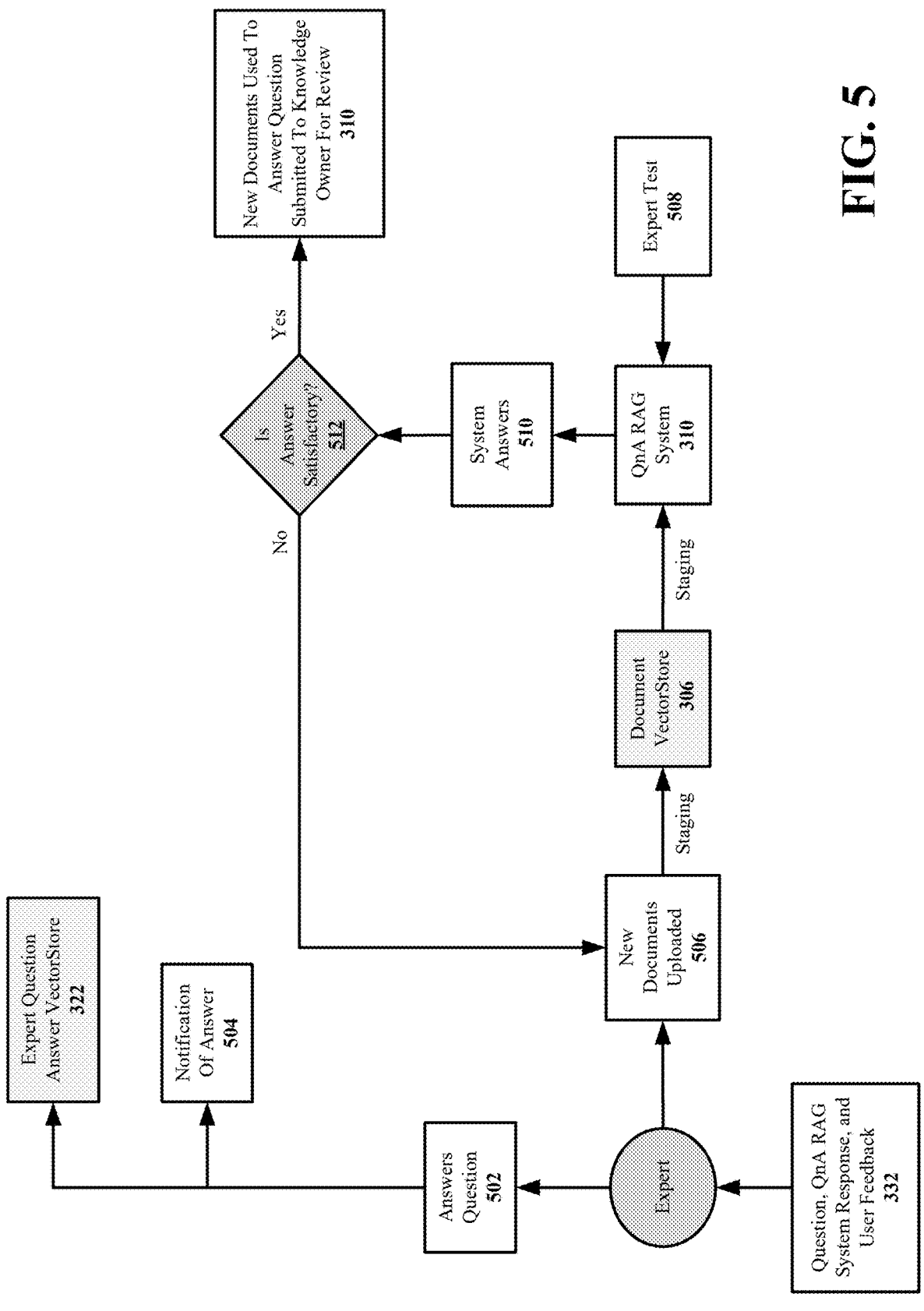
FIG. 5 illustrates an example expert flow diagram in accordance with some embodiments described herein.

Next, FIG. 5 illustrates an example expert flow diagram 500 that can facilitate automated expert-augmented updating of knowledge bases for RAG systems. The expert flow diagram 500 starts by receiving 332 as input(s) a query (e.g., a question from a user), a response generated by a QnA RAG system, and any user feedback received pertaining to sufficiency of the generated response. The expert flow diagram 500 continues to 502, wherein the expert provides a solution to the query (e.g., an answer to the user question). The answer is then provided 504 to the user, and the associated knowledge base (e.g., the Expert Question and Answer VectorStore 322; the second knowledge base index of relevant expert question-answer pairs) is updated to include the expert's 502 solution. The expert also can identify whether new documents are needed in order for the RAG system to answer the question. The expert flow diagram 500 continues to 506, in which the new documents identified by the expert are staged for uploading to the Document VectorStore 306 (e.g., the first knowledge base index of relevant documents). The expert flow diagram 500 then continues to 510, in which the expert tests 508 the QnA RAG System 310 to determine whether the QnA RAG System 310 can now successfully answer the original query (e.g., by using the new documents identified by the expert). If the QnA RAG System 310 can generate a satisfactory solution to the original query, The expert flow diagram 500 then continues to 310, wherein the new documents used to answer the query are submitted to a Knowledge Owner for review. If the QnA RAG System 310 fails to generate a satisfactory solution to the original query, the expert flow diagram 500 then returns to 506.

Figure 6:
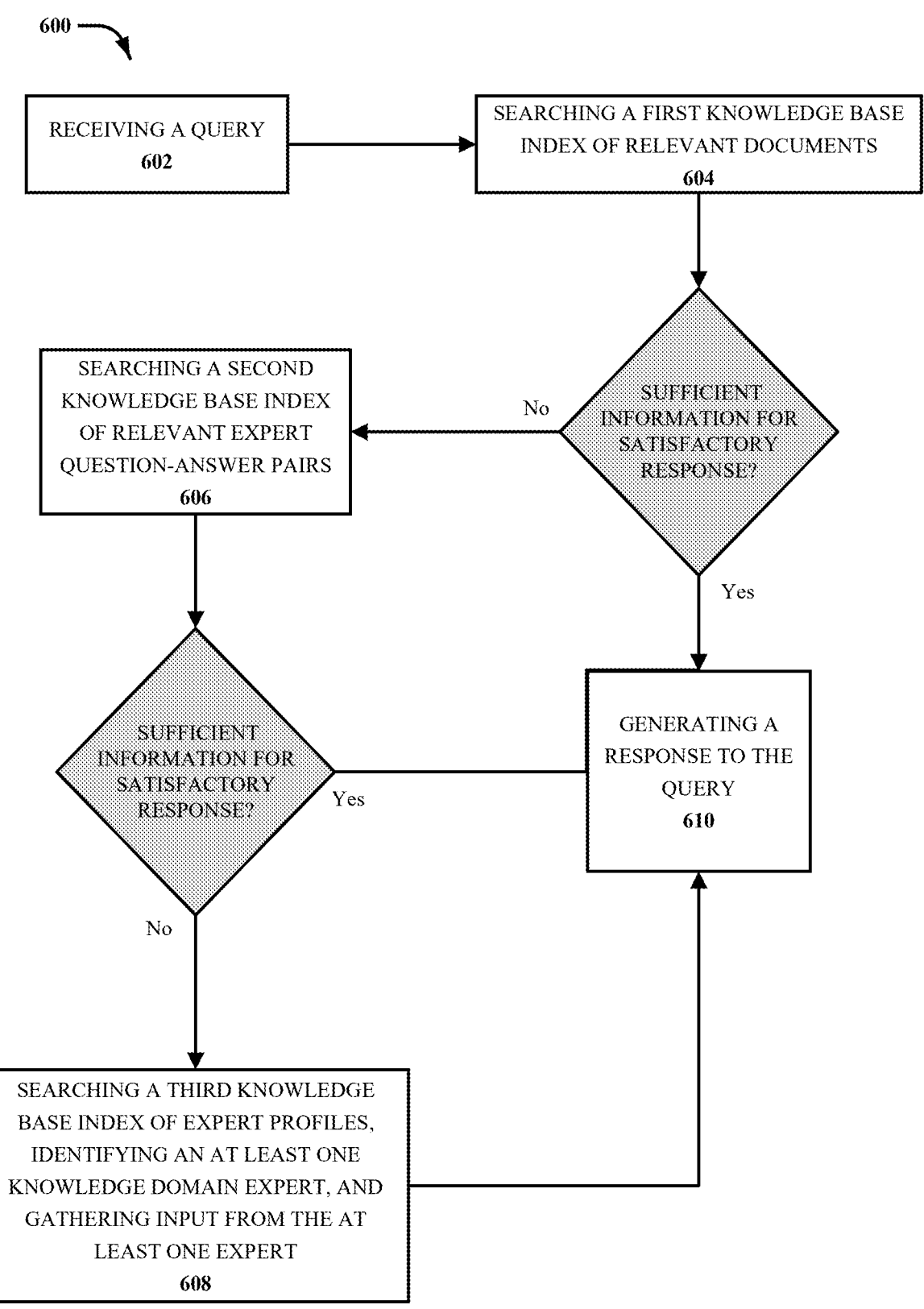

Next, FIG. 6 illustrates a flow diagram of a method 600 that can facilitate automated expert-augmented updating of knowledge bases for RAG systems in accordance with some embodiments described herein such as the system 200 of FIG. 2 and the system 100 of FIG. 1. While the method 600 is described relative to the system 200 of FIG. 2, the method 600 can be applicable also to other systems described herein. Repetitive description of like elements and/or processes employed in respective embodiments is omitted for sake of brevity.

At 602, the method 600 can include receiving a query (e.g., a question from a user). The method 600 may use a system operatively coupled to the processor (e.g., reception component 106) to receive the query.

At 604, the method 600 can include searching a first knowledge base index of relevant documents. The method 600 can use a system operatively coupled to the processor (e.g., reception component 106) to search the first knowledge base index of relevant documents.

The method 600 can include determining whether there is sufficient information for developing a satisfactory response to the query. The method 600 can use a system operatively coupled to the processor (e.g., reception component 106) to determine whether there is sufficient information for developing a satisfactory response to the query.

If there is sufficient information, the method 600 can include 610 generating a response to the query. The method 600 can use a system operatively coupled to the processor (e.g., response component 116) to generate the response to the query.

If there is not sufficient information to generate a response to the query, the method 600 can include 606 searching a second knowledge base index of relevant expert question and answer pairs. The method 600 can use a system operatively coupled to the processor (e.g., question component 110) to search the second knowledge base index of relevant expert question and answer pairs.

The method 600 can include determining whether there is sufficient information for developing a satisfactory response to the query. The method 600 can use a system operatively coupled to the processor (e.g., question component 110) to determine whether there is sufficient information for developing a satisfactory response to the query.

If there is sufficient information, the method 600 can include 610 generating a response to the query. The method 600 can use a system operatively coupled to the processor (e.g., response component 116) to generate the response to the query.

If there is not sufficient information to generate a response to the query, the method 600 can include 608 searching a third knowledge base index of expert profiles, identifying an at least one knowledge domain expert, and gathering input from the at least one expert. The method 600 can use a system operatively coupled to the processor (e.g., expert identification component 114) to search the third knowledge base index of expert profiles, identify the at least one knowledge domain expert, and gather input from the at least one expert.

The method 600 can include 610 generating a response to the query. The method 600 can use a system operatively coupled to the processor (e.g., response component 116) to generate the response to the query. In some embodiments, the method 600 can be performed by a system such as system 100 of FIG. 1 or system 200 of FIG. 2.

Next, FIG. 7 illustrates a flow diagram of a method 700 that can facilitate automated expert-augmented updating of knowledge bases for RAG systems in accordance with some embodiments described herein such as the system 200 of FIG. 2 and the system 100 of FIG. 1. While the method 700 is described relative to the system 200 of FIG. 2, the method 700 can be applicable also to other systems described herein. Repetitive description of like elements and/or processes employed in respective embodiments is omitted for sake of brevity.

At 602, the method 700 can include receiving a query (e.g., a question from a user). The method 700 may use a system operatively coupled to the processor (e.g., reception component 106) to receive the query.

At 704, the method 700 can include searching a first knowledge base index of relevant documents. The method 700 can use a system operatively coupled to the processor (e.g., reception component 106) to search the first knowledge base index of relevant documents.

The method 700 can include determining whether there is sufficient information for developing a satisfactory response to the query. The method 700 can use a system operatively coupled to the processor (e.g., reception component 106) to determine whether there is sufficient information for developing a satisfactory response to the query.

If there is sufficient information, the method 700 can include 610 generating a response to the query. The method 700 can use a system operatively coupled to the processor (e.g., response component 116) to generate the response to the query. At 702, the method 700 can include receiving feedback from a user regarding sufficiency of the generated response. The method 700 can use a system operatively coupled to the processor (e.g., feedback component 202) to receive the feedback.

At 606, the method 700 can include searching a second knowledge base index of relevant expert question and answer pairs. The method 700 can use a system operatively coupled to the processor (e.g., question component 110) to search the second knowledge base index of relevant expert question and answer pairs.

At 608, the method 700 can include searching a third knowledge base index of expert profiles, identifying an at least one knowledge domain expert, and gathering input from the at least one expert. The method 700 can use a system operatively coupled to the processor (e.g., expert identification component 114) to search the third knowledge base index of expert profiles, identify the at least one knowledge domain expert, and gather input from the at least one expert.

At 704, the method 700 can include generating a new response to the query. The method 700 can use a system operatively coupled to the processor (e.g., response component 116) to generate the new response to the query.

In some embodiments, the searching the second knowledge base index of relevant expert question-answer pairs can be performed in response to a determination that there is not sufficient information in the first knowledge base index of relevant documents to generate a satisfactory response to the query.

In various embodiments, the searching the third knowledge base index of expert profiles, identifying the at least one knowledge domain expert, and gathering input from the at least one expert can be performed in response to a determination that there is not sufficient information in the first knowledge base index of relevant documents or the second knowledge base index of relevant expert question-answer pairs to generate a satisfactory response to the query.

In some embodiments, the method 700 can further comprise updating a knowledge base index based on the received feedback.

FIG. 8 and the following discussion are intended to provide a brief, general description of a suitable computing environment 800 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as iteratively updating the preliminary recovery plan until a failure-free recovery plan is developed with knowledge base update code 880. In addition to block 880, computing environment 800 includes, for example, computer 801, wide area network (WAN) 802, end user device (EUD) 803, remote server 804, public cloud 805, and private cloud 806. In this embodiment, computer 801 includes processor set 814 (including processing circuitry 820 and cache 821), communication fabric 811, volatile memory 812, persistent storage 813 (including operating system 822 and block 845, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method can be distributed among multiple computers and/or between multiple locations. On the other hand, in this presentation of computing environment 800, detailed discussion is focused on a single computer, specifically computer 801, to keep the presentation as simple as possible. Computer 801 can be located in a cloud, even though it is not shown in a cloud in FIG. 8. On the other hand, computer 801 is not required to be in a cloud except to any extent as can be affirmatively indicated.

PROCESSOR SET 810 includes one, or more, computer processors of any type now known or to be developed in the future. Processing circuitry 820 can be distributed over multiple packages, for example, multiple, coordinated integrated circuit chips. Processing circuitry 820 can implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set can be located "off chip." In some computing environments, processor set 810 can be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods can be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory can be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 can be a read only memory (ROM), but typically at least a portion of the persistent storage allows writing of data, deletion of data and re-writing of data. Some familiar forms of persistent storage include magnetic disks and solid-state storage devices. Operating system 822 can take several forms, such as various known proprietary operating systems or open-source Portable Operating System Interface type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 can include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 can be persistent and/or volatile. In some embodiments, storage 824 can take the form of a quantum computing storage device for storing data in the form of qubits. In embodiments where computer 801 is required to have a large amount of storage (for example, where computer 801 locally stores and manages a large database) then this storage can be provided by peripheral storage devices designed for storing large amounts of data, such as a storage area network (SAN) that is shared by multiple, geographically distributed computers. IoT sensor set 825 is made up of sensors that can be used in Internet of Things applications. For example, one sensor can be a thermometer, and another sensor can be a motion detector.

NETWORK MODULE 815 is the collection of computer software, hardware, and firmware that allows computer 801 to communicate with other computers through WAN 802. Network module 815 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and can take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 can be a client device, such as thin client, heavy client, mainframe computer and/or desktop computer.

REMOTE SERVER 804 is any computer system that serves at least some data and/or functionality to computer 801. Remote server 804 can be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data can be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs can be stored as images and can be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware and firmware allowing public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to some embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory configured to store computer executable components; and
a processor that executes at least one of the computer executable components that:
accesses multiple knowledge base indexes comprising a document vector store that stores embeddings for documents of a knowledge base, an expert question-answer vector store that stores embeddings for expert question-answer pairs that could not be answered based on the knowledge base, and an expert profiles vector store that stores embeddings for expert profiles;
receives a query; and
in response to receiving the query:
performs a first semantic search over the document vector store using a first knowledge base index of relevant documents,
determines whether there is sufficient information resulting from the first semantic search to satisfactorily respond to the query according to a defined criterion,
based on determining that the first semantic search did not result in sufficient information to satisfactorily respond to the query according to the defined criterion, performs a second semantic search over the expert question-answer vector store using a second knowledge base index of relevant expert question-answer pairs, determines whether there is sufficient information resulting from the second semantic search to satisfactorily respond to the query according to the defined criterion,
based on determining that the second semantic search did not result in sufficient information to satisfactorily respond to the query according to the defined criterion, performs a third semantic search over the expert profiles vector store using a third knowledge base index of expert profiles, wherein performing the third semantic search comprises:
identifying at least one knowledge domain expert,
gathering input from the at least one knowledge domain expert, wherein the input comprises one or more expert-recommended documents not yet present in the document vector store,
storing the one or more expert-recommended documents in a staging document vector store that is separate from the document vector store, and
performing a staged retrieval-augmented generation using only the staging document vector store to attempt to generate sufficient information to satisfactorily respond to the query according to the defined criterion,
determining whether there is sufficient information resulting from the third semantic search to satisfactorily respond to the query according to the defined criterion,
upon a determination that any results of the first semantic search, the second semantic search, and the third semantic search resulted in sufficient information to satisfactorily respond to the query according to the defined criterion, generates a response to the query, and
based on a determination that the staged retrieval-augmented generation resulted in sufficient information to satisfactorily respond to the query according to the defined criterion, promotes the one or more expert-recommended documents from the staging document vector store into the document vector store for use in responding to subsequent queries.

2. The system of claim 1, wherein the at least one of the computer executable components further:
receives feedback from a user regarding sufficiency of the response to the query.

3. The system of claim 2, wherein the at least one of the computer executable components further:
updates at least one of the document vector store, the expert question-answer vector store, or the expert profiles vector store based on the received feedback.

4. The system of claim 1, wherein the at least one of the computer executable components further:
gathers additional input from guardrails models or knowledge content owners to evaluate sufficiency of the first knowledge base index.

5. The system of claim 4, wherein the additional input pertains to at least one of adherence to organizational policies, ethical standards, or regulatory requirements.

6. The system of claim 4, wherein the at least one of the computer executable components further:
identifies inconsistencies, redundancies, or inaccuracies in at least one of the document vector store, the expert question-answer vector store, or the expert profiles vector store and updates the at least one of the document vector store, the expert question-answer vector store, or the expert profiles vector store.

7. The system of claim 1, wherein the at least one of the computer executable components further:

updates at least one of the document vector store, the expert question-answer vector store, or the expert profiles vector store based on additional input from a respective knowledge owner.

8. The system of claim 1, wherein the at least one of the computer executable components further:

identifies the at least one knowledge domain expert based on qualifications or contextual information stored in the expert profiles vector store.

9. The system of claim 8, wherein the qualifications further comprise a degree to which a knowledge domain expert's associated profile aligns with a subject matter or content of the query.

10. The system of claim 9, wherein the degree to which the knowledge domain expert's associated profile aligns with the subject matter or content of the query is determined by at least one of: the knowledge domain expert's expertise area, experience, or relevant certifications.

11. The system of claim 8, wherein the contextual information further comprises at least one of: historical responsiveness of the expert to prior queries, availability of the expert, or urgency of the query.

12. A computer-implemented method, comprising:

accessing, by a system comprising a processor, multiple knowledge base indexes comprising a document vector store that stores embeddings for documents of a knowledge base, an expert question-answer vector store that stores embeddings for expert question-answer pairs that could not be answered based on the knowledge base, and an expert profiles vector store that stores embeddings for expert profiles, receiving, by the system, a query; and in response to receiving the query:

performing, by the system, a first semantic search over the document vector store using a first knowledge base index of relevant documents, determining, by the system, whether there is sufficient information resulting from the first semantic search to satisfactorily respond to the query according to a defined criterion, based on determining that the first semantic search did not result in sufficient information to satisfactorily respond to the query according to the defined criterion, performing, by the system, a second semantic search over the expert question-answer vector store using a second knowledge base index of relevant expert question-answer pairs;

determining, by the system, whether there is sufficient information resulting from the second semantic search to satisfactorily respond to the query according to the defined criterion, based on determining that the second semantic search did not result in sufficient information to satisfactorily respond to the query according to the defined criterion, performing, by the system, a third semantic search over the expert profiles vector store using a third knowledge base index of expert profiles, wherein performing the third semantic search comprises:

identifying at least one knowledge domain expert, gathering input from the at least one knowledge domain expert wherein the input comprises one or more expert-recommended documents not yet present in the document vector store, storing the one or more expert-recommended documents in a staging document vector store that is separate from the document vector store, and performing a staged retrieval-augmented generation using only the staging document vector store to attempt to generate sufficient information to satisfactorily respond to the query according to the defined criterion, determining, by the system, whether there is sufficient information resulting from the third semantic search to satisfactorily respond to the query according to the defined criterion, upon a determination that any results of the first semantic search, the second semantic search, and the third semantic search resulted in sufficient information satisfactorily respond to the query according to the defined criterion, generating, by the system, a response to the query, and based on a determination that the staged retrieval-augmented generation resulted in sufficient information to satisfactorily respond to the query according to the defined criterion, promoting, by the system, the one or more expert-recommended documents from the staging document vector store into the document vector store for use in responding to subsequent queries.

13. The method of claim 12, further comprising receiving, by the system, feedback from a user regarding sufficiency of the response to the query.

14. The computer-implemented method of claim 13, further comprising updating, by the system, at least one of the document vector store, the expert question-answer vector store, or the expert profiles vector store based on the received feedback.

15. The computer-implemented method of claim 12, further comprising gathering, by the system, additional input from guardrails models or knowledge content owners to evaluate sufficiency of the first knowledge base index, wherein the additional input pertains to at least one of adherence to organizational policies, ethical standards, or regulatory requirements.

16. A computer program product comprising a non-transitory computer readable storage having program instructions embodied therewith, the program instructions executable by a processor to cause the processor to:

access multiple knowledge base indexes comprising a document vector store that stores embeddings for documents of a knowledge base, an expert question-answer vector store that stores embeddings for expert question-answer pairs that could not be answered based on the knowledge base, and an expert profiles vector store that stores embeddings for expert profiles;

receive a query; and in response to receiving the query:

perform a first semantic search over the document vector store using a first knowledge base index of relevant documents, determine whether there is sufficient information resulting from the first semantic search to satisfactorily respond to the query according to a defined criterion, based on determining that the first semantic search did not result in sufficient information to satisfactorily respond to the query according to the defined criterion, perform a second semantic search over the expert question-answer vector store using a second knowledge base index of relevant expert question-answer pairs;

determine whether there is sufficient information resulting from the second semantic search to satisfactorily respond to the query according to the defined criterion, based on determining that the second semantic search did not result in sufficient information to satisfactorily respond to the query according to the defined criterion, perform a third semantic search over the expert profiles vector store using a third knowledge base index of expert profiles, wherein performing the third semantic search comprises:

identifying at least one knowledge domain expert, gathering input from the at least one knowledge domain expert wherein the input comprises one or more expert-recommended documents not yet present in the document vector store, storing the one or more expert-recommended documents in a staging document vector store that is separate from the document vector store, and performing a staged retrieval-augmented generation using only the staging document vector store to attempt to generate sufficient information to satisfactorily respond to the query according to the defined criterion, determine whether there is sufficient information resulting from the third semantic search to satisfactorily respond to the query according to the defined criterion, upon a determination that any results of the first semantic search, the second semantic search, and the third semantic search resulted in sufficient information satisfactorily respond to the query according to the defined criterion, generate a response to the query, and based on a determination that the staged retrieval-augmented generation resulted in sufficient information to satisfactorily respond to the query according to the defined criterion, promote the one or more expert-recommended documents from the staging document vector store into the document vector store for use in responding to subsequent queries.

17. The computer program product of claim 16, wherein the program instructions are executable by the processor to cause the processor to receive feedback from a user regarding sufficiency of the response to the query.

18. The computer program product of claim 17, wherein the program instructions are executable by the processor to cause the processor to update at least one of the document vector store, the expert question-answer vector store, or the expert profiles vector store based on the received feedback.

19. The computer program product of claim 16, wherein the program instructions are executable by the processor to cause the processor to gather additional input from guardrails models or knowledge content owners to evaluate sufficiency of the first knowledge base index.

20. The computer program product of claim 19, wherein the additional input pertains to at least one of adherence to organizational policies, ethical standards, or regulatory requirements.

* * * * *